United States Patent [19]

Stoneburner

[11] 4,390,883

[45] Jun. 28, 1983

[54] FLUID JET PRINT HEAD AND METHOD OF TERMINATING OPERATION THEREOF

[75] Inventor: Leonard G. Stoneburner, Richmond Dale, Ohio

[73] Assignee: The Mead Corporation, Dayton, Ohio

[21] Appl. No.: 300,146

[22] Filed: Sep. 8, 1981

[51] Int. Cl.³ .................... G01D 15/18
[52] U.S. Cl. .................... 346/75; 346/140 R
[58] Field of Search .................... 346/75, 140 IJ

[56] References Cited

U.S. PATENT DOCUMENTS

| | | | |
|---|---|---|---|
| 3,589,612 | 6/1971 | Shaffer | 239/139 |
| 3,701,998 | 10/1972 | Mathis | 346/75 |
| 3,730,133 | 5/1973 | Cordiano et al. | 118/2 |
| 3,839,721 | 10/1974 | Chen et al. | 346/75 |
| 3,891,121 | 6/1975 | Stoneburner | 222/1 |
| 3,970,222 | 7/1976 | Duffield | 222/148 |
| 3,995,813 | 12/1976 | Bart et al. | 239/584 |
| 4,042,937 | 8/1977 | Perry et al. | 346/1 |
| 4,109,282 | 8/1978 | Robertson et al. | 358/127 |
| 4,144,537 | 3/1979 | Kimura et al. | 346/140 |
| 4,160,982 | 7/1979 | Keur | 346/75 |

FOREIGN PATENT DOCUMENTS

| | | |
|---|---|---|
| 3002068 | 7/1980 | Fed. Rep. of Germany . |
| 2905063 | 8/1980 | Fed. Rep. of Germany . |

OTHER PUBLICATIONS

Research Disclosure, Sep. 1980, "Diaphragm Shutdown & Start Up of Ink Jet Print Head," p. 376, No. 197.

*Primary Examiner*—George H. Miller, Jr.
*Attorney, Agent, or Firm*—Biebel, French & Nauman

[57] ABSTRACT

A fluid jet print head includes a manifold defining a fluid receiving reservoir and at least one orifice communicating with the reservoir. An inflation means cooperates with the manifold and expands within the reservoir to displace fluid from the reservoir. The inflation means contacts the manifold, thus sealing the orifice and terminating fluid flow through the orifice. In a first embodiment, the inflatable means includes an elastic diaphragm which may be inflated to extend into the reservoir. In a second embodiment, the inflatable means includes an elastic tube, sealed at a first end thereof and extending into the reservoir. When pressurized air is applied to the interior of the tube, the tube expands, filling the reservoir and sealing the orifices.

24 Claims, 7 Drawing Figures

FLUID JET PRINT HEAD AND METHOD OF TERMINATING OPERATION THEREOF

BACKGROUND OF THE INVENTION

The present invention relates to fluid jet print heads of the type used in ink jet printing and, more particularly, to a print head in which shutdown of the print head is facilitated, and in which the print head orifices are closed during periods in which the print head is not in operation.

Prior art fluid jet print heads typically include a manifold defining a fluid reservoir to which ink is supplied under pressure, and at least one orifice communicating with the reservoir. Ink from the reservoir flows through the orifice and forms a fluid filament. Mechanical disturbances are applied to the fluid filament, as for example by means of a piezoelectric transducer, to stimulate the fluid filament to break up into a jet drop stream. As drops are formed from the fluid filament, the drops are selectively charged and, thereafter, are deflected by an electrostatic field such that they are separated into print and catch trajectories. The drops in the print trajectories strike a print receiving medium, such as a paper web, while the drops in the catch trajectories are directed to a drop catcher, which ingests the drops and returns them to the ink supply system for reuse. One such prior art print head is shown in U.S. Pat. No. 3,701,998, issued Oct. 31, 1972, to Mathis.

A significant problem encountered with fluid jet print heads occurs during shutdown of the print head. In order to terminate fluid flow through the orifice, typically the fluid pressure is rapidly reduced. This pressure reduction requires a finite time period, however, and at some point the fluid pressure within the print head is reduced to a degree that the jet drop streams tend to become unstable, both in trajectory and in drop size. As a result various components of the printer in which the print head is incorporated may be wetted to a degree that they can no longer function.

An additional problem exists with respect to such print heads during periods of nonuse. Either ink is removed completely from the print head during shutdown by a sequence of operations including flushing of the print head with a purge fluid and drying of the print head with air, or, alternatively, the ink is allowed to remain within the print head. The former shutdown procedure is relatively complicated, requiring additional valves and controls, as well as sources of pressurized air and purge fluid, while permitting fluid to remain in the print head raises the possibility of weeping of the print fluid through the orifices and wetting of various printer components.

U.S. Pat. No. 4,042,937, issued Aug. 16, 1975, to Perry et al, discloses an ink supply system in which sequencing of purging, start up, print operation, and shutdown of the printer are controlled by a pair of solenoid actuated valves connected in the inlet and outlet lines of the print head. The inlet valve is connected between a pump and the print head, while the outlet valve is connected between the print head and a supply tank which provides ink to the pump. At shutdown of the printer, the inlet valve is closed while the outlet valve is held open, thus creating a negative pressure in the head. The pump is then turned off.

Ink is maintained within the print head during the period of time in which the printer is shutdown. Perry et al suggests it may be desirable to purge the print head of air bubbles subsequent to shutdown to prevent drying of ink inside the print head. Nevertheless, drying of ink and precipitation of particulate contaminants may occur within the print head during protracted shutdown periods, with the result that the print head nozzles or orifices may become clogged. Additionally, there remains the possibility that ink may weep through the nozzles during periods of shutdown, producing undesirable wetting of various printer elements.

Other types of ink jet printers have included a provision for removing all of the ink from the print head reservoir during periods of printer shutdown in order to minimize clogging of the print head orifices and to reduce the possibility of weeping of ink through the orifices. This necessarily complicates start up and shutdown of the printer, however. U.S. Pat. No. 3,970,222, issued July 20, 1976, to Duffield, discloses such an ink jet printer.

U.S. Pat. No. 3,891,121, issued June 24, 1975, to Stoneburner, discloses a start up method in which the print head reservoir, initially dry, is prepressurized with air and a flushing liquid before supplying ink to the manifold. At shutdown of the printer, the flow of ink to the print head reservoir is replaced with a flow of flushing fluid. The flow of flushing fluid is then terminated and, simultaneously, an evacuation line leading to a low pressure source is opened, removing fluid from the manifold. The manifold is thereafter maintained in a dry condition until start up of the printer is subsequently initiated.

In order to avoid the difficulties encountered with print heads of the type from which ink is removed during shutdown periods, while at the same time eliminating the possibility of ink drying in the print head orifices and clogging the orifices, as may occur with printers of the type in which ink is maintained within the print head during shutdown periods, U.S. Pat. No. 3,839,721, issued Oct. 1, 1974, to Chen et al, discloses a printer arrangement having a liquid filled container which is movable with respect to the jet nozzles or orifices. The container, filled with water or water containing detergent, submerges the print head nozzles during shutdown periods and prevents drying of ink within the nozzles. In an alternative embodiment, the nozzles are submerged in a mist or vapor which prevents ink drying.

Such an arrangement adds significantly to the size, complexity, and costs of the printer. Additionally, contaminants in the ink within the print head may settle during periods of printer shutdown, causing the nozzles or orifices to become clogged. Similar arrangements are shown in U.S. Pat. No. 4,160,982, issued July 10, 1979, to Keur, and U.S. Pat. No. 4,144,537, issued Mar. 13, 1979, to Kimura et al. In these patents, devices external to the print head are provided to cap or cover the print head nozzle during periods of shutdown.

Other prior art devices have utilized valving arrangements within the print head for controlling fluid flow through an orifice. A marking device is disclosed in U.S. Pat. No. 3,730,133, issued May 1, 1973, to Cordiano et al, which includes a solenoid actuated needle valve within the fluid chamber. The needle valve is periodically opened during operation of the device to permit fluid flow through the orifice when desired. Opening the needle valve produces a slug of marking fluid which is directed at a print receiving surface. While such a needle valve arrangement permits the orifice to be closed during periods of nonuse, it is disadvantageous in that each orifice must necessarily have its own separate needle valve and associated controlling solenoid. As a consequence, it is not practical to utilize such a needle valve arrangement in a print head having a large number of closely spaced orifices.

Another arrangement for controlling fluid flow through an orifice internally of a marking head is shown in U.S. Pat. No. 4,109,282, issued Aug. 22, 1978, to Robertson et al. The Robertson device includes a writing head formed with a plurality of nibs. Each nib includes a duct formed with two passageways; one passageway supplies clear ink to the paper and the other supplies black ink to the paper. Strips of film material within the nib, having electrically conductive coatings, may be deflected so as to permit the application of either clear ink or black ink to the paper. The Robertson et al device is, however, not capable of terminating the flow of ink through the nib completely.

Finally, an arrangement for controlling the flow of ink through an orifice internally of a print head is shown in German published application No. 2905063, filed Feb. 10, 1979, published Aug. 14, 1980, and assigned to Olympia Werke A.G. The Olympia application discloses a piezoelectric pressure generator which presses a central diaphragm within the fluid reservoir of a print head toward the print head orifice. The diaphragm defines an opening which is covered by the transducer such that ink is forced from the orifice. On the return stroke of the transducer, the transducer moves away from the diaphragm opening, thus permitting the diaphragm to return ot its original position without drawing air into the reservoir through the orifice. The diaphragm is not utilized for terminating the flow of ink through the orifice, however.

Accordingly, it is seen that there is a need for a simple, reliable fluid jet print head in which ink flow through the print head orifice or orifices may be prevented during periods of print head shutdown and, further, in which the shutdown operation of the print head is facilitated.

SUMMARY OF THE INVENTION

A fluid jet print head includes a manifold means defining a fluid receiving reservoir, a fluid inlet communicating with the reservoir, and at least one orifice communicating with the fluid reservoir. A means is provided for supplying fluid through the fluid inlet to the reservoir to produce a jet drop stream emanating from the orifice. An inflatable means cooperates with the manifold means for expansion within the fluid reservoir to displace fluid therefrom and contact the manifold means so as to seal the orifice and terminate fluid flow through the orifice.

The inflatable means may comprise an elastic diaphragm mounted within the manifold means and extending across the fluid receiving reservoir so as to form one wall of the reservoir, opposite the orifice. The manifold means may further define an inflation chamber on the side of the elastic diaphragm opposite the fluid receiving reservoir, and an air inlet, communicating with the inflation chamber, for supplying air to the inflation chamber at a pressure sufficient to expand the elastic diaphragm into the reservoir. The elastic diaphragm may be made of neoprene or, alternatively, of silicone rubber.

The means for supplying fluid through the fluid inlet may provide fluid at a first predetermined pressure. The fluid jet print head may further comprise means for supplying air to the air inlet at a second predetermined pressure which is greater than the first predetermined pressure.

The print head may further include a stimulator means, mounted in the inflation chamber in contact with the elastic diaphragm, for applying mechanical stimulation to the fluid in the reservoir through the diaphragm, whereby pressure waves pass through the fluid and produce uniform break up of drops in the jet drop stream. The stimulator means may comprise at least one piezoelectric transducer.

The manifold means may comprise an upper manifold portion defining an inflation chamber, a lower manifold portion including an orifice plate defining the fluid receiving reservoir, and means for securing together the upper manifold portion and the lower manifold portion with the elastic diaphragm compressed at its periphery therebetween. The elastic diaphragm provides a fluid seal between the inflation chamber and the reservoir and, additionally, acts as a gasket between the upper manifold portion and the lower manifold portion.

The manifold means may define a plurality of orifices, arranged in at least one row, for producing a plurality of jet drop streams. The elastic diaphragm may contact the manifold means so as to terminate fluid flow through the plurality of orifices.

In an alternative embodiment, the inflatable means may comprise an elastic tube, sealed at a first end thereof, extending into the fluid receiving reservoir such that the first end of the tube is on the opposite side of the orifice from the tube inlet. The elastic tube may extend through the fluid inlet into the fluid receiving reservoir.

The manifold means may further define a plurality of orifices arranged in at least one row, with the elastic tube extending from the fluid inlet past all of the plurality of orifices such that inflation of the elastic tube seals all of the plurality of orifices.

The fluid jet print head may further comprise means, connected to the end of the elastic tube opposite the first end thereof, for applying pressurized air to the elastic tube to cause inflation of the tube and sealing of the orifices, and for applying a partial vacuum to the tube to evacuate the interior of the tube and fully collapse the tube. The elastic tube may be made of surgical rubber.

The fluid jet print head may include means, connected to the end of the elastic tube opposite the first end thereof, for supplying air to the interior of the tube at a second predetermined pressure which is greater than the first predetermined pressure of the fluid in the reservoir.

The print head may comprise stimulator means mounted on the manifold in contact with the orifice plate at a point on the opposite side of the first end of the elastic tube from the fluid inlet for applying mechanical stimulation to the orifice plate. This arrangement produces traveling waves which pass along the orifice plate, causing uniform drop breakup of the jet drop streams emanating from the orifices.

The method of terminating production of jet drop streams in a fluid jet print head having a manifold means defining a fluid receiving reservoir, a fluid inlet communicating with the reservoir, and at least one orifice communicating with the fluid reservoir, and means for supplying fluid through said fluid inlet to said fluid reservoir to produce a jet drop stream emanating from the orifice, includes the steps of:

(a) substantially reducing the volume of the reservoir by movement of a sealing means therein, and
(b) bringing the sealing means into contact with the manifold means so as to seal the orifice.

The sealing means may define a wall of the reservoir opposite the orifice, and the step of substantially reducing the volume of the fluid reservoir may include the step of moving the sealing means toward the orifice until the sealing means contacts the manifold means.

Alternatively, the sealing means may include an inflatable tube positioned within the fluid reservoir, and the step of substantially reducing the volume of the fluid reservoir may include the step of inflating the tube until the tube contacts the manifold means.

Accordingly, it is an object of the present invention to provide a fluid jet print head and a method for terminating production of a jet drop stream, in which a sealing means within the reservoir of the print head manifold decreases the volume of the reservoir and contacts the manifold in a manner so as to seal the print head orifice or orifices; to provide such a print head and method in which the sealing means is inflatable; to provide such a print head and method in which the sealing means comprises a diaphragm extending across the reservoir with a source of pressurized air being applied to the side of the diaphragm opposite the reservoir so as to move the diaphragm into the reservoir; to provide such a print head and method in which the sealing means is an elastic tube with a source of pressurized air being provided to inflate the tube within the manifold reservoir so as to seal the orifice plate; and to provide such a print head and method in which a plurality of orifices may be sealed.

Other objects and advantages of the invention will be apparent from the following description, the accompanying drawings and the appended claims.

DETAILED DESCRIPTION OF THE PREFERRED EMBODIMENTS

Figure 1:
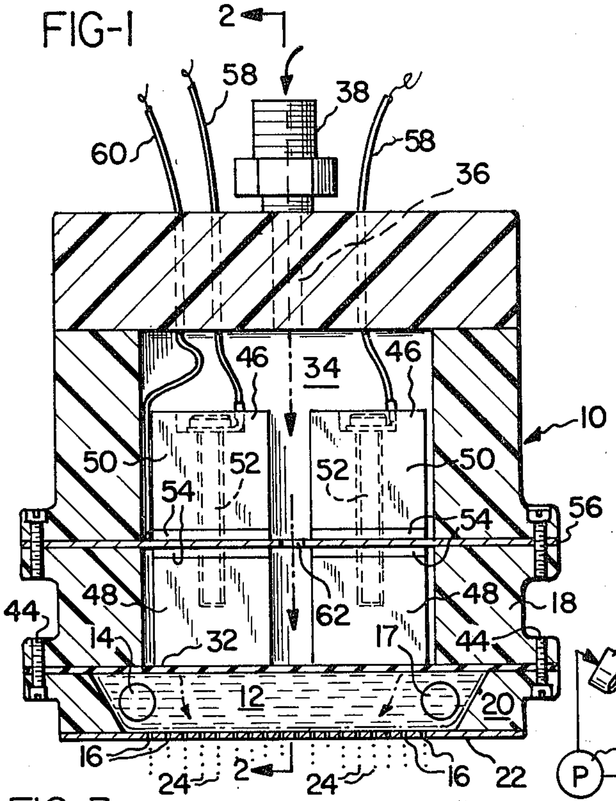
FIG. 1 is a front view of a first embodiment of the fluid jet print head of the present invention, with the manifold in section.
Figure 2:
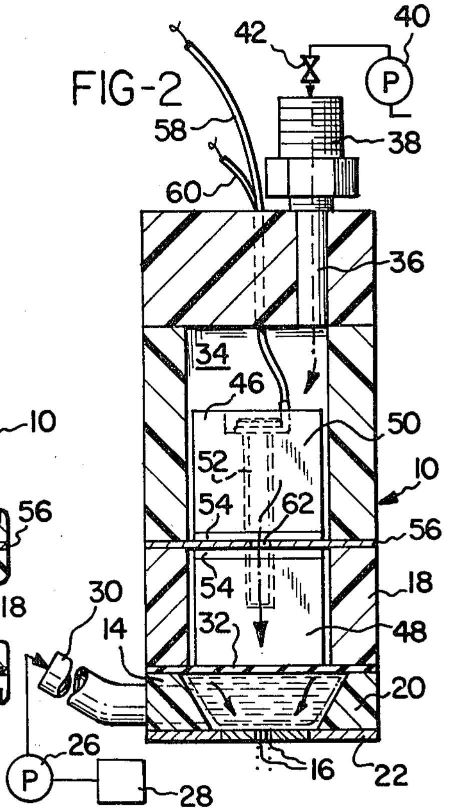
FIG. 2 is a sectional view taken generally along line 2—2 in FIG. 1.
Figure 3:
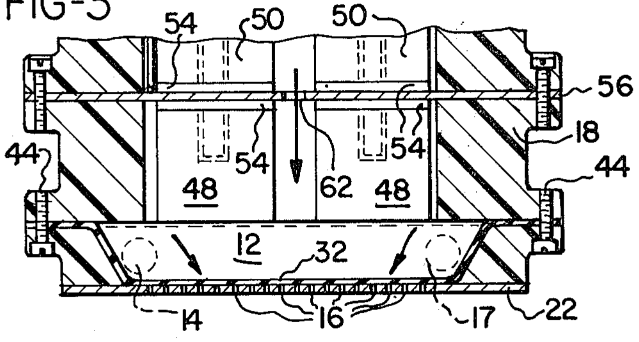
FIG. 3 is a partial sectional view, similar to FIG. 1, illustrating inflation of the elastic diaphragm at shutdown of the print head.
Figure 4:
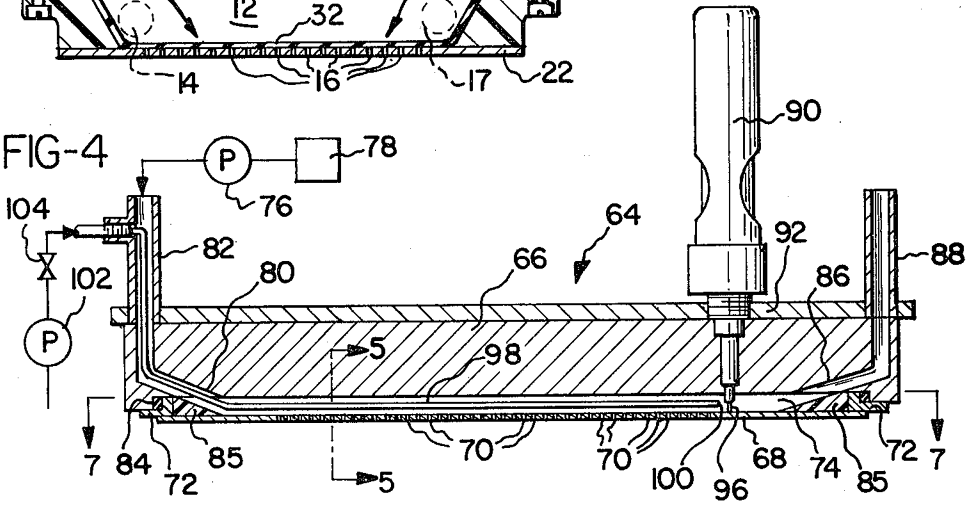
FIG. 4 is a front view of a second embodiment of the print head of the present invention, with the manifold in section.

Reference is now made to FIGS. 1-3 which illustrate a first embodiment of the fluid jet print head of the present invention. A manifold means 10 defines a fluid receiving reservoir 12, a fluid inlet 14 communicating with the reservoir 12, and a plurality of orifices 16 which communicate with the reservoir 12. The manifold further defines a fluid outlet 17. The manifold 10 may include an upper manifold portion 18 and a lower manifold portion 20. An orifice plate 22 is attached to manifold portion 20 and defines a plurality of orifices 16 which are arranged in a pair of parallel rows.

A means for supplying a fluid, such as an electrically conductive ink, through the fluid inlet 14 to the fluid reservoir 12 to produce jet drop streams 24 may typically include a pump 26. Pump 26 receives fluid from a supply tank 28 and supplies it through inlet line 30 inlet 14 at a pressure sufficient to produce jet drop streams 24. An inflatable means, including elastic diaphragm 32, is positioned within the manifold means 10. Diaphragm 32 may be made of neoprene or silicone rubber. As described more fully below, diaphragm 32 expands within the fluid reservoir 12 to displace fluid therefrom. When fully inflated, diaphragm 32 contacts the manifold means so as to seal the orifices 16 and terminates fluid flow through the orifices, as shown in FIG. 3.

Elastic diaphragm 32 is mounted to extend across the fluid receiving reservoir 12 so as to form one wall of the reservoir, opposite orifices 16. The upper manifold portion 18 defines an inflation chamber 34 on the side of the diaphragm 32 opposite the fluid receiving reservoir 12. An air inlet 16 is connected to fitting 38 and communicates with inflation chamber 34. When pump 40 supplies air to chamber 34 via valve 42 at a sufficient pressure, elastic diaphragm 32 expands into reservoir 12. Bolts 44 extend through flanges in upper manifold portion 18 and lower manifold portion 20 and provide a means for securing together portions 18 and 20 with the elastic diaphragm 32 compressed at its periphery therebetween. Diaphragm 32 provides a fluid seal between inflation chamber 34 and reservoir 12 and, additionally, acts as a gasket between manifold portions 18 and 20.

A stimulator means, including piezoelectric transducers 46, is mounted in inflation chamber 34 in contact with the elastic diaphragm 32, for applying mechanical stimulation through the diaphragm to the fluid in the reservoir 12. Vibration produced by transducers 46 causes pressure waves to pass downward through the fluid in reservoir 12, producing uniform breakup of drops in the jet drop streams 24.

Each piezoelectric transducer 46 includes an electrically conductive piston 48 and an electrically conductive reaction mass 50 which are joined together by electrically conductive bolts 52. Sandwiched between reaction mass 50 and piston 48 in each transducer are a pair of piezoelectric elements 54 positioned on opposite sides of a nodal mounting plate 56. Bolts 52 pass through oversized openings in elements 54 and plate 56 and are electrically isolated therefrom. Electrical connectors 58 ground bolts 52 and thus provide a ground potential on the outer faces of piezoelectric elements 54. A high frequency electrical signal is applied to nodal support plate 56 via conductor 60 which causes piezoelectric elements 54 to expand and contract. This produces an oscillating vertical movement of pistons 48 and an opposing movement of reaction masses 50, with the result that diaphragm 32 is vibrated at a relatively high frequency. The masses of pistons 48 and reaction masses 50 are approximately equal. As a consequence, transducers 46 are mounted on support plate 56 at a nodal point and the vibrations of transducers 46 are not transmitted to manifold means 10.

In operation of the print head, fluid is supplied through inlet 14 to reservoir 12 at a first predetermined pressure which is sufficient to produce fluid flow through the orifices 16, and formation of jet drop streams 24. An outlet valve connected to outlet 17 is normally closed and during operation of the print head, no fluid leaves the reservoir through outlet 17.

In order to enhance the breakup of the jet drop streams into drops of uniform size and spacing, transducers 46 are energized to vibrate in synchronization and cause plane waves to pass downward from the diaphragm 32 through the fluid in reservoir 12. These waves are coupled to the fluid flowing through orifices 16 and produce pressure perturbations within the fluid filaments emerging from the orifices 16. As a consequence, drops of substantially uniform size and spacing are formed.

When it is desired to terminate operation of the print head, valve 42 is opened and air is supplied to inflation chamber 34 at a pressure which exceeds the pressure of the fluid within reservoir 12. Air flows through the inflation chamber 34 and passes downward through opening 62 in plate 56 so as to force the diaphragm 32 downward into reservoir 12. As diaphragm 32 moves downward, the fluid within the reservoir 12 is maintained at a pressure at least as great as the fluid pressure within the reservoir during normal print head operation. As a consequence, the velocity of fluid in the jet drop streams 24 is not reduced and the jets do not seriously deteriorate in trajectory. After a short period of time, the diaphragm 32 contacts the top of orifice plate 22, as shown in FIG. 3, sealing the orifices 16. Pump 26 is then turned off and the print head remains as shown in FIG. 3 until a subsequent operation is initiated. By positively sealing the orifices 16, weeping of print fluid from the reservoir 12 is prevented. Additionally, the print fluid does not dry in the orifices and clogging of the orifices is therefore eliminated.

A second embodiment of the present invention, which may be used with a print head of the type having traveling wave stimulation, is illustrated in FIGS. 4–7. A manifold 64, including a manifold body 66, an orifice plate 68 defining orifices 70, and an orifice plate holder 72, defines a fluid receiving reservoir 74. Fluid is supplied to reservoir 74 by pump 76 which receives the fluid from a supply tank 78. Pump 76 supplies the fluid to reservoir 74 through a fluid inlet 80 via an inlet line 82.

Orifice plate 68 is attached to orifice plate holder 72 by appropriate means, such as adhesive bonding or soldering, and holder 72 is attached to manifold body 66 by screws (not shown) with O-ring 84 providing a fluid-tight seal therebetween. Dampers 85 are positioned at each end of orifice plate 68 to prevent undesirable wave reflections. Manifold body 66 further defines a fluid outlet 86 connected to an outlet tube 88.

Figure 7:
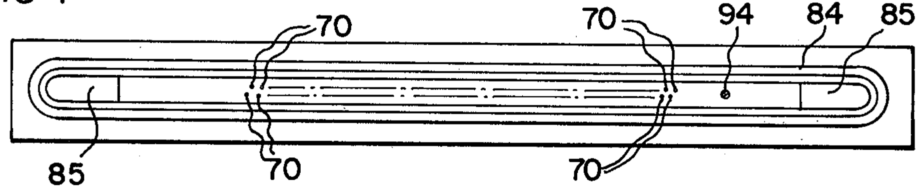
FIG. 7 is a plan view of the orifice plate and orifice plate holder of the embodiment of FIG. 4, as seen generally from line 7—7 in FIG. 4.

A stimulator means including piezoelectric stimulator 90 is mounted on support plate 92 and extends into reservoir 74 to contact orifice plate 68 at point 94 (FIG. 7). The end 96 of transducer 90 vibrates, causing bending waves to travel along the orifice plate 68. The waves are coupled to the fluid flowing through orifices 70.

An inflatable means comprising an elastic tube 98 extends into fluid receiving reservoir 74 through the fluid inlet 80. Tube 98 is closed at its first end 100 such that when air is supplied to the tube 98 by pump 102 via valve 104, the tube is inflated as shown in FIG. 6. Alternatively, pump 102 may be reversed to provide a partial vacuum to the interior of tube 98, thus causing it to collapse as seen in FIG. 5.

Figure 5:
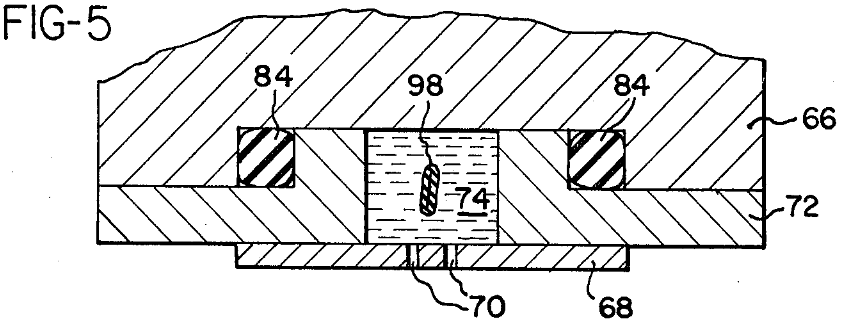
FIG. 5 is an enlarged sectional view taken generally along line 5—5 in FIG. 4.
Figure 6:
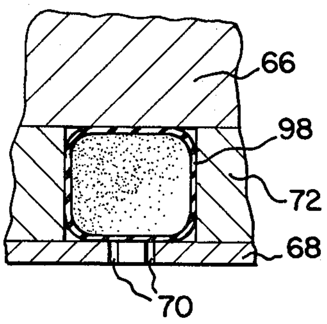
FIG. 6 is a partial sectional view, similar to FIG. 5, illustrating inflation of the elastic tube at shutdown of the print head.

During normal operation of the fluid jet print head, the tube 96 is maintained in a collapsed state, as shown in FIG. 5. When it is desired to terminate operation of the fluid jet print head, however, air is supplied to the interior of tube 98 at a pressure in excess of the fluid pressure within the reservoir 74. As a consequence, the tube 98 is inflated, reducing the volume of the reservoir available for the fluid, while at the same time ensuring that the pressure of the fluid remaining in the reservoir is at least as great as the pressure of the fluid during normal operation. As a consequence, the velocity of the fluid flowing through the orifices 70 is maintained as the tube 98 is inflated. When the tube 98 is fully inflated, as shown in FIG. 6, it contacts the top of the orifice plate 68, sealing all of the orifices 70 so as to prevent further fluid flow through the orifices. At this point, the pump 76 is turned off and shutdown of the fluid jet print head is completed.

In both embodiments of the present invention, positive sealing of the orifices in the orifice plate is provided after the print head is shutdown, while the fluid pressure within the reservoir during the shutdown transition period is maintained so as to prevent instability of the jet drop streams and wetting of printer elements. Additionally, since the orifices are sealed during periods of shutdown, weeping of fluid through the orifices and drying of fluid in the orifices are prevented. By utilizing such an inflation arrangement to seal the orifices, it is possible to close simultaneously a great many small, closely spaced orifices.

While the forms of apparatus herein described constitute preferred embodiments of the invention, it is to be understood that the invention is not limited to these precise forms of apparatus, and that changes may be made therein without departing from the scope of the invention.

What is claimed is:

1. A fluid jet print head, comprising:

manifold means defining a fluid receiving reservoir, a fluid inlet communicating with said fluid reservoir, and at least one orifice communicating with said fluid reservoir, means for supplying fluid through said fluid inlet to said fluid reservoir to produce a jet drop stream emanating from said orifice, and inflatable means, cooperating with said manifold means, for expansion within said fluid reservoir to displace fluid therefrom and contact said manifold means so as to seal said orifice and terminate fluid flow through said orifice.

2. The fluid jet print head of claim 1 in which said inflatable means comprises an elastic diaphragm mounted within said manifold means and extending across said fluid receiving reservoir so as to form one wall of said reservoir, opposite said orifice.

3. The fluid jet print head of claim 2 in which said elastic diaphragm is made of neoprene.

4. The fluid jet print head of claim 2 in which said elastic diaphragm is made of silicone rubber.

5. The fluid jet print head of claim 2 in which said manifold means defines a plurality of orifices, arranged in at least one row, for producing a plurality of jet drop streams, and in which said elastic diaphragm may contact said manifold means so as to terminate fluid flow through said plurality of orifices.

6. The fluid jet print head of claim 2 in which said manifold means further defines an inflation chamber on the side of said elastic diaphragm opposite said fluid receiving reservoir, and an air inlet, communicating with said inflation chamber, for supplying air to said inflation chamber at a pressure sufficient to expand said elastic diaphragm into said reservoir.

7. The fluid jet print head of claim 6 in which said manifold means comprises an upper manifold portion defining said inflation chamber, a lower manifold portion including an orifice plate defining said fluid receiving reservoir, and means for securing together said upper manifold portion and said lower manifold portion with said elastic diaphragm compressed at its periphery therebetween, whereby said elastic diaphragm provides a fluid seal between said inflation chamber and said reservoir and, additionally, acts as a gasket between said upper manifold portion and said lower manifold portion.

8. The fluid jet print head of claim 6 in which said means for supplying fluid through said fluid inlet provides fluid at a first predetermined pressure and, further, comprising means for supplying air to said air inlet at a second predetermined pressure, said second predetermined pressure being greater than said first predetermined pressure.

9. The fluid jet print head of claim 6 further comprising stimulator means, mounted in said inflation chamber in contact with said elastic diaphragm, for applying mechanical stimulation to said fluid in said reservoir through said diaphragm, whereby pressure waves pass through said fluid and produce uniform break up of drops in said jet drop stream.

10. The fluid jet print head of claim 9 in which said stimulator means comprises at least one piezoelectric transducer.

11. The fluid jet print head of claim 1 in which said inflatable means comprises an elastic tube, sealed at a first end thereof, extending into said fluid receiving reservoir such that said first end of said elastic tube is on the opposite side of said orifice from said fluid inlet.

12. The fluid jet print head of claim 11 further comprising means, connected to the end of said elastic tube opposite said first end thereof, for applying pressured air to said elastic tube to cause inflation of said tube and sealing of said orifices, and for applying a partial vacuum to said tube to evacuate the interior of said tube and fully collapse said tube.

13. The fluid jet print head of claim 11 in which said elastic tube is made of surgical rubber.

14. The fluid jet print head of claim 11 in which said means for supplying fluid through said fluid inlet provides fluid at a first predetermined pressure and, further, comprising means, connected to said end of said elastic tube opposite said first end thereof, for supplying air to the interior of said tube at a second predetermined pressure, said second predetermined pressure being greater than said first predetermined pressure.

15. The fluid jet print head of claim 11 in which said elastic tube extends through said fluid inlet into said fluid receiving reservoir.

16. The fluid jet print head of claim 15 in which said manifold means further defines a plurality of orifices arranged in at least one row, and in which said elastic tube extends from said fluid inlet past all of said plurality of orifices, whereby inflation of said elastic tube seal all of said plurality of orifices.

17. The fluid jet print head of claim 16 in which said manifold means includes an orifice plate defining said plurality of orifices and, further, comprising stimulator means mounted on said manifold means in contact with said orifice plate at a point on the opposite side of said first end of said elastic tube from the fluid inlet for applying mechanical stimulation to said orifice plate, whereby traveling waves pass along said orifice plate and produce uniform drop break up of the jet drop streams emanating from said orifices.

18. A fluid jet print head, comprising:

manifold means defining a fluid receiving reservoir, a fluid inlet communicating with said reservoir, and a plurality of orifices communicating with said fluid receiving reservoir, means for supplying fluid through said fluid inlet to said reservoir to produce a plurality of jet drop streams emanating from said orifices, and sealing means within said print head means for movement within said reservoir into sealing contact with said manifold means around each of said orifices, whereby said orifices are sealed and fluid flow therethrough is terminated.

19. The fluid jet print head of claim 18 in which said sealing means comprises inflatable means for expansion within said reservoir to displace fluid therefrom and contact said manifold means so as to seal said orifices.

20. The fluid jet print head of claim 19 in which said inflatable means comprises an elastic diaphragm mounted in said manifold means and extending across said fluid receiving reservoir so as to form one wall of said reservoir, opposite said orifices.

21. The fluid jet printer of claim 19 in which said inflatable means comprises an elastic tube sealed at a first end thereof and extending into said fluid receiving reservoir.

22. In a fluid jet print head having a manifold means defining a fluid receiving reservoir, a fluid inlet communicating with said fluid reservoir, and at least one orifice communicating with said fluid reservoir, and means for supplying fluid through said fluid inlet to said reservoir to produce a jet drop stream emanating from said orifice, the method of terminating production of said jet drop stream, comprising the steps of:

substantially reducing the volume of said fluid reservoir by movement of a sealing means therein, and bringing said sealing means into contact with said manifold means so as to seal said orifice.

23. The method of claim 22 in which said sealing means defines a wall of said fluid reservoir opposite said orifice, and in which the step of substantially reducing the volume of said fluid reservoir includes the step of:

moving said sealing means toward said orifice until said sealing means contacts said manifold means.

24. The method of claim 22 in which said sealing means comprises an inflatable tube positioned within said fluid reservoir, and in which the step of substantially reducing the volume of said fluid reservoir includes the step of:

inflating said tube until said tube contacts said manifold means.

* * * * *